US011321740B2

(12) United States Patent
Rao

(10) Patent No.: US 11,321,740 B2
(45) Date of Patent: May 3, 2022

(54) ENCOURAGEMENT OF CONVERSION OF CUSTOMERS DURING THEIR ONLINE JOURNEYS

(71) Applicant: Dell Products L.P., Round Rock, TX (US)

(72) Inventor: Venkata Chandra Sekar Rao, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 16/410,265

(22) Filed: May 13, 2019

(65) Prior Publication Data

US 2020/0364750 A1 Nov. 19, 2020

(51) Int. Cl.
*G06Q 30/02* (2012.01)
*G06N 20/00* (2019.01)

(52) U.S. Cl.
CPC ......... *G06Q 30/0269* (2013.01); *G06N 20/00* (2019.01); *G06Q 30/0202* (2013.01); *G06Q 30/0277* (2013.01)

(58) Field of Classification Search
CPC ..................................................... G06Q 30/02
See application file for complete search history.

(56) References Cited

U.S. PATENT DOCUMENTS

| 7,006,979 | B1* | 2/2006 | Samra | G06Q 20/085 |
| | | | | 705/7.28 |
| 2014/0297363 | A1* | 10/2014 | Vemana | G06Q 30/0269 |
| | | | | 705/7.29 |
| 2016/0217515 | A1* | 7/2016 | Vijayaraghavan | G06Q 30/06 |

OTHER PUBLICATIONS

Vail, An Empirical Study of Consumer Perceptions and Comprehension of Web Site Privacy Policies, 2008, IEEE, vol. 55, No. 3, 442-453. (Year: 2008).*

* cited by examiner

*Primary Examiner* — Hafiz A Kassim
*Assistant Examiner* — Zahra Elkassabgi
(74) *Attorney, Agent, or Firm* — Terrile, Cannatti & Chambers, LLP; Emmanuel A. Rivera

(57) ABSTRACT

Technology that facilitates the encouragement of conversion of customers during their online journeys is disclosed. Exemplary implementations may: monitor an online journey of a customer with an entity; profile the customer to select a persona of a plurality of personas; predict a lack of conversion by the customer during the monitored online journey of the customer; and in response to the prediction, offer an optional online path forward for the customer's online journey to the customer.

17 Claims, 3 Drawing Sheets

ENCOURAGEMENT OF CONVERSION OF CUSTOMERS DURING THEIR ONLINE JOURNEYS

BACKGROUND

A customer journey involves every interaction that a customer has with a particular entity (such as a business selling products and/or services). When a customer buys a product or service, that transaction is just a part of what is essentially a journey created by all the customer-to-entity interactions leading up to and following the purchase.

The online journey is the online portion of a customer's journey. The customer's online journey includes the online interactions between the customer and the entity. Online interactions being those that occur on a public network, such as the Internet. Examples of online interactions include browsing a website, reading an electronic message (e.g., e-mail message), online chat, and the like.

SUMMARY

One aspect of the present disclosure relates to a system configured that facilitates the conversion of customers during their online journeys. The system may include one or more hardware processors configured by machine-readable instructions. The processor(s) may be configured to monitor an online journey of a customer with an entity. The processor(s) may be configured to profile the customer to select a persona of a plurality of personas. Each persona may have one or more prototype customer journeys associated therewith and wherein the profiling selection is based, at least in part, on the closest match between the customer's online journey and its selected persona of the pluralities of personas. The processor(s) may be configured to predict a lack of conversion by the customer during the monitored online journey of the customer. The prediction may be based, at least in part. The selected persona of the customer wherein a conversion includes the customer may purchase or committing to purchase goods or services from the entity. The processor(s) may be configured to, response to the prediction, offer an optional online path forward for the customer's online journey to the customer. The optional online path may be one that is likely to lead to the conversion of the customer. The prediction may be based, at least in part, on a path to conversion for the selected persona.

Another aspect of the present disclosure relates to a method that facilitates the conversion of customers during their online journeys. The method may include monitoring an online journey of a customer with an entity. The method may include profiling the customer to select a persona of a plurality of persona. Each persona may have one or more prototype customer journeys associated therewith and wherein the profiling selection is based, at least in part, on the closest match between the customer's online journey and its selected persona of the pluralities of personas. The method may include predicting a lack of conversion by the customer during the monitored online journey of the customer. The prediction may be based, at least in part. The selected persona of the customer wherein a conversion includes the customer may purchase or committing to purchase goods or services from the entity. The method may include, in response to the prediction, offering an optional online path forward for the customer's online journey to the customer. The optional online path may be one that is likely to lead to the conversion of the customer. The prediction may be based, at least in part, on a path to conversion for the selected persona.

Yet another aspect of the present disclosure relates to a non-transient computer-readable storage medium having instructions embodied thereon, the instructions being executable by one or more processors to perform a method that facilitates the conversion of customers during their online journeys. The method may include monitoring an online journey of a customer with an entity. The method may include profiling the customer to select a persona of a plurality of personas. Each persona may have one or more prototype customer journeys associated therewith and wherein the profiling selection is based, at least in part, on the closest match between the customer's online journey and its selected persona of the pluralities of personas. The method may include predicting a lack of conversion by the customer during the monitored online journey of the customer. The prediction may be based, at least in part. The selected persona of the customer wherein a conversion includes the customer may purchase or committing to purchase goods or services from the entity. The method may include, in response to the prediction, offering an optional online path forward for the customer's online journey to the customer. The optional online path may be one that is likely to lead to the conversion of the customer. The prediction may be based, at least in part, on a path to conversion for the selected persona.

These and other features, and characteristics of the present technology, as well as the methods of operation and functions of the related elements of structure and the combination of parts and economies of manufacture, will become more apparent upon consideration of the following description and the appended daft s with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention, As used in the specification and in the claim the singular for of 'a', 'an' and 'the' include plural referents unless the context clearly dictates otherwise.

BRIEF DESCRIPTION OF THE DRAWINGS

The Detailed Description references the accompanying figures, in the figures, the left-most digit(s) of a reference number identifies the figure in which the reference number first appears, The same numbers are used throughout the drawings to reference like features and components.

DETAILED DESCRIPTION

Figure 1:
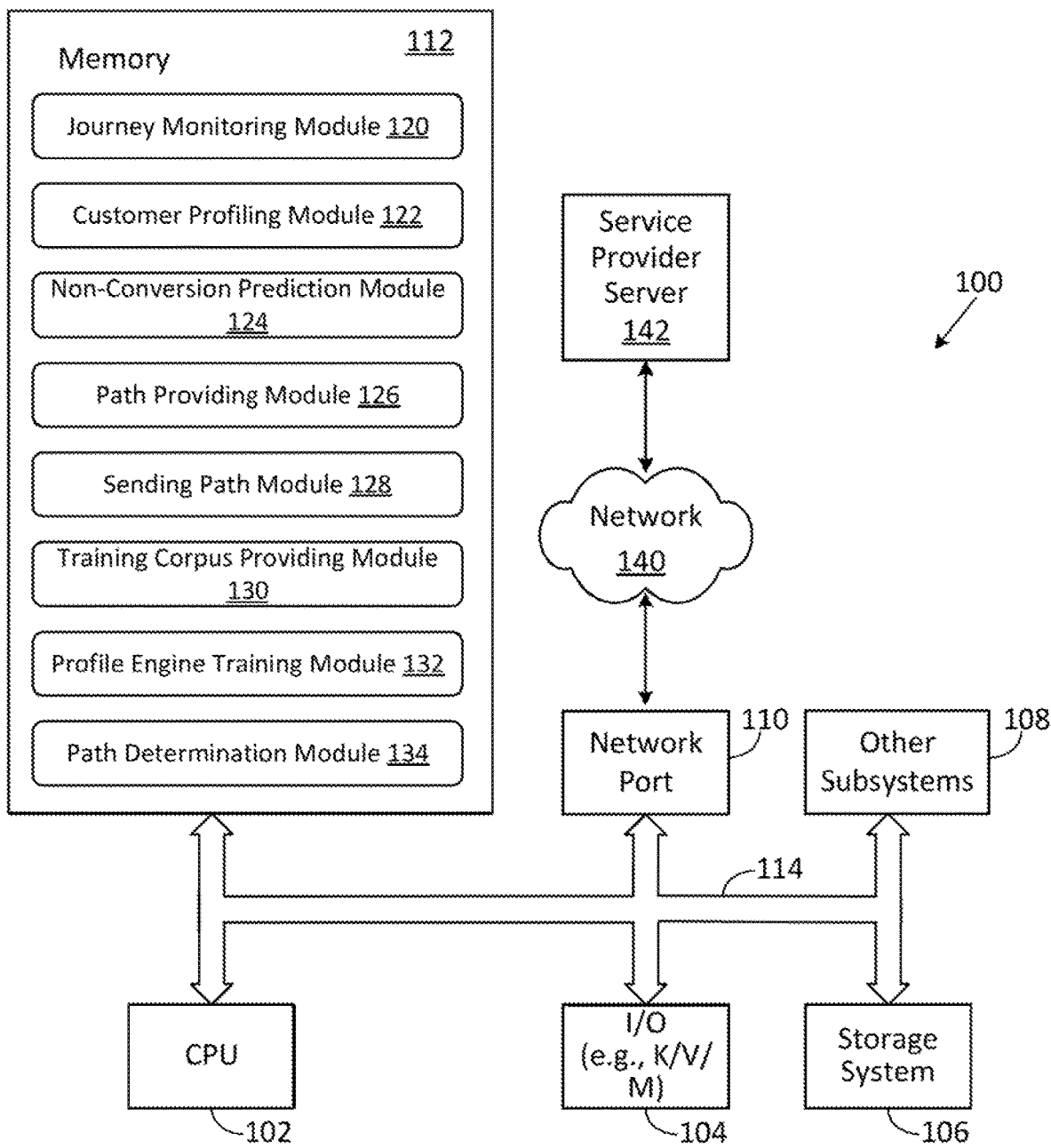
FIG. 1 illustrates a system configured that facilitates the encouragement of the conversion of customers during their online journeys, in accordance with one or more implementations.

Technology that facilitates the encouragement of conversion of customers during their online journeys is disclosed. Exemplary implementations may: monitor an online journey of a customer with an entity; profile the customer to select a persona of a plurality of personas; predict a lack of conversion by the customer during the monitored online journey of the customer; and in response to the prediction, offer an optional online path forward for the customer's online journey to the customer.

Entities, such as companies, frequently allocate marketing budgets to promote their business through online campaigns using multiple different channels. As used herein, an entity may be, for example, a business, company, online retailer, online wholesaler, cooperative, exchange, charity, and foundation. The entity provides offerings to customers. Examples of offerings include opportunities for customers to purchase goods and/or services from the entity or an agent of the entity. In some instances, the offering may include opportunities for customers to barter or make donations.

Herein, a customer includes an individual or another entity that has a business history of accepting the offerings of the entity. Thus, there is a customer relationship between the customer and the entity. Unless indicated by the context otherwise, a customer, as used herein, also includes individual or businesses that have the potential to become an active customer. A potential customer includes those who receive or observe marking information of the entity and those interacting with the entity in anticipation of a sale or conversion. Thus, unless the context indicates differently herein, a customer includes both actual customers and potential customers.

As used herein, a conversion is successful completion of a transaction between the customer and the entity. For example, a conversion may include a customer who purchases a pair of sunglasses from an e-commerce website. In contrast, a non-conversion (i.e., lack of conversion) is said to have occurred when the customer chooses to not purchase anything during the customer's visit to the entity's e-commerce website.

Marketing involves the activities that an entity undertakes to promote their offerings to customers. Marketing includes advertising, selling, and delivering of offerings to customers. More particularly, online marketing involves marketing actions taken via public networks, such as the internet. Often an online marketing campaign (or simply, online campaign) involves online promotional actions taken across multiple different online channels.

Examples of online channels that may be part of an online campaign include websites, search-engine optimization, pay-per-click advertising, social media advertising, online influencer advertising, viral video or meme promotion, online display advertising, email marketing, text message marketing, and the like.

A customer's online journey may involve multiple different channels that each include one or more interactions between the customer and the entity. Herein, a customer-to-entity interaction involves a customer sending and/or receiving marketing or sales information via one or more online channels to/from the entity and vice versa. As used herein, such an interaction may be called a "touchpoint."

For example, touchpoints include reading a promotional email, clicking on a link in such an email, clicking on options on an e-commerce site or mobile app (i.e., application), advertisements in videos, links in invoices and receipts, and the like. During an online journey, the time between touchpoints is called "time lag" herein. For example, a customer may click on a link of an e-commerce website to see product description. That is a touchpoint. The time until the next touchpoint (e.g., click of a "purchase" button) is the time lag.

FIG. 1 is a generalized illustration of an information handling system that can be used to implement the example system 100. This example system configured to that facilitates the conversion of customers during their online journeys in accordance with one or more implementations.

The example system 100 includes a processor (e.g., central processor unit or "CPU") 102, input/output (I/O) devices 104, such as a display, a keyboard, a mouse, and associated controllers, a storage system 106 (e.g., a hard drive), and various other subsystems 108. In various embodiments, the example routing-script verification system 100 also includes network port 110 operable to connect to a network 140, which is likewise accessible by a service provider server 142. The example routing-script verification system 100 likewise includes system memory 112, which is interconnected to the foregoing via one or more buses 114.

System memory 112 may store data and machine-readable instructions. The example system 100 may be configured by the machine-readable instructions. Machine-readable instructions may include one or more instruction modules. The instruction modules may include computer program modules. The instruction modules may include one or more of the journey monitoring module 120, customer profiling module 122, the non-conversion prediction module 124, a path providing module 126, path sending module 128, training corpus providing module 130, profile engine training module 132, the path determination module 134, and/or other instruction modules.

Journey monitoring module 120 may be configured to monitor an online journey of a customer with an entity. The entity may have an ongoing online marketing campaign with one or more online channels for customer-to-entity interaction (i.e., touchpoint). An online journey of the customer may include one or more touchpoints on one or more online channels that occur on a public communications network, such as the Internet. By way of non-limiting example, the entity may include a business, company, online retailer, online wholesaler, cooperative, exchange, charity, and foundation.

Customer profiling module 122 may be configured to profile the customer to select a persona of a plurality of personas. Each persona may have one or more prototype customer journeys associated therewith and wherein the profiling selection is based, at least in part, on the closest match between the customer's online journey and its selected persona of the pluralities of personas.

The customer profiling module 122 has multiple different persona classifications. Each persona corresponds to a typical pattern of online behavior of customer-to-entity interactions. These personas may be determined heuristically and/or via profiling engine (that employs machine learning) that has been trained using a training corpus of many actual or representative customers on their online journeys with the entity.

The following are examples of personas that may exist with an implementation of the customer profiling module 122. To be easy to remember, each persona is labeled with a human name preceded by a helpful descriptor. The indented line after describes the persona:

Impatient-Ian
    Easily frustrated, not afraid to speak their mind
Discount-daisy
    Responds to offers and deals
Researcher Richard
    Research every aspect of a product
Returning Rita
    Return items at a much higher level
Lost Diamond Lucy
    High value lapsed purchaser Single Suzy
    Shopped earlier and won't come back
Suggestible Sally
    Read emails and click through to a website and look into suggested products X The customer profiling module 122 compares the pattern of the customer's monitored online journey to that of each persona. The customer profiling module 122 assigns or selects the persona to the customer that have the most closely matching customer journeys. Note that the patterns that are being matched include both the trail of touchpoints and their associated time lags.

Non-conversion prediction module 124 may be configured to predict a lack of conversion by the customer during the monitored online journey of the customer. That is, the non-conversion prediction module 124 may be configured to predict that the customer is likely not to convert. That is, the customer is likely not to make a purchases, complete a transaction, etc. with the entity. This prediction may be based, at least in part, on the selected persona of the customer. Some personas are more likely than others to convert. In addition, this prediction may be based, at least in part, on the current and/or past touchpoints. Further, this prediction may be based, at least in part, on time lags associated with current and/or past touchpoints. The likelihood of conversion varies depending on the current touchpoint in the journey, the trail of touchpoints leading to the current touchpoint, associated time lags, and/or the selected persona.

Path providing module 126 may be configured to, in response to the prediction of non-conversion, offer an optional online path forward for the customer's online journey to the customer. The optional online path may be one that is likely to lead to the conversion of the customer. The prediction may be based, at least in part, on a path to conversion for the selected persona. The likelihood of conversion is improved by varies the path forward from the current touchpoint in the journey. This new path is based on the current touchpoint in the monitored journey, the trail of touchpoints leading to the current touchpoint, associated time lags, and/or the selected persona (and their associated online journeys to conversion).

Sending path module 128 may be configured to send the customer onto the selected optional path towards conversion. That is, once the path to conversion is determined by the path providing module 126, the sending path module 128 actually sends the customer onto the new path.

For example, website may be dynamically generated based on the circumstances and data about the user. In such a situation, dynamic pages may be generated as new path. This new path may correspond to pates that were visited during training based on persona during customer journey.

As mentioned above, the profiling engine may be trained. This may be accomplished, at least in part, by training corpus providing module 130 and profile engine training module 132. Training corpus providing module 130 may be configured to provide a training corpus to a profile engine. A training corpus is a record of many actual or representative online journeys of customer-to-entity interactions. A profile engine is one or more computing devices and/or instruction modules employing machine learning techniques of data analysis that automates analytical model building. It is often considered a branch of artificial intelligence based on the idea that systems can learn from data, identify patterns and make decisions with minimal human intervention.

By way of non-limiting example, the training corpus may include historical data related to multiple customers, historical data related to customer-and-entity interactions of the multiple customers, and historical data of online journeys of multiple customers, historical data regarding conversions of the multiple customers. The data also includes the time lag along the online journey.

Profile engine training module 132 may be configured to train the profile engine to generate the pluralities of personas that categorize the multiple customers based on their customer-and-entity interactions. The profiling may consider present and historical data related to the customer, present and historical data related to customer-and-entity interactions, and associated time lags.

Profile engine training module 132 may employ multivariate support vector machine (SVM) technology to classify personas and calculate the distance to each data point from the mean of each persona to find out whether data point belongs to their respective persona.

Path determination module 134 may be configured to determine likely paths to conversion for one or more of the categorized personas. This module may be used by or a subset of the path providing module 126. The path determination module 134. The determination may be based, at least in part, on a path to conversion for the selected persona. The likelihood of conversion is improved by varies the path forward from the current touchpoint in the journey. This determined path is based on the current touchpoint in the monitored journey, the trail of touchpoints leading to the current touchpoint, and the selected persona (and their associated online journeys to conversion).

In addition, the life of the online campaign may be another factor that may be considered in the non-conversion prediction and/or path determination. An entity may launch a multi-channel online campaign. The timing of that campaign's launch and the interaction of the customer's journey may factor into the predictions and path determination. For example, the customers may be more likely to convert at early on after the launch of a new online campaign. Conversely, the customers may be less likely to convert once the campaign is old.

Storage system 106 may comprise non-transitory storage media that electronically stores information. The electronic storage media of storage system 106 may include one or both of system storage that is provided integrally (i.e., substantially non-removable) from a computer and/or removable storage that is removably connectable to a computer via, for example, a port (e.g., a USB port, a firewire port, etc.) or a drive (e.g., a disk drive, etc.). Storage system 106 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Storage system 106 may store software algorithms, information determined by processor(s) 102, information received from a server, information received from a client computing platform(s), and/or other information that enables the example routing-script verification system 100 to function as described herein.

Processor(s) 102 may be configured to provide information processing capabilities. As such, processor(s) 102 may include one or more of a digital processor, an analog processor, a digital circuit designed to process information, an analog circuit designed to process information, a state machine, and/or other mechanisms for electronically processing information. Although processor(s) 102 is shown in FIG. 1 as a single entity, this is for illustrative purposes only. In some implementations, processor(s) 102 may include a plurality of processing units. These processing units may be physically located within the same device, or processor(s) 102 may represent processing functionality of a plurality of devices operating in coordination.

Processor(s) 102 may be configured to execute modules 120, 122, 124, 126, 128, 130, 132, and/or 134, and/or other modules. Processors) 102 may be configured to execute modules 120, 122, 124, 126, 128, 130, 132, and/or 134, and/or other modules by software; hardware; firmware; some combination of software, hardware, and/or firmware; and/or other mechanisms for configuring processing capabilities on processor(s) 102. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 120, 122, 124, 126, 128, 130, 132, and/or 134 are illustrated in FIG. 1 as being implemented within a single processing unit, in implementations in which processor(s) 102 includes multiple processing units, one or more of modules 120, 122, 124, 126, 128, 130, 132, and/or 134 may be implemented remotely from the other modules. The description of the functionality provided by the different modules 120, 122, 124, 126, 128, 130, 133, and/or 134 described below is for illustrative purposes, and is not intended to be limiting, as any of modules 120, 122, 124, 126, 128, 130, 132, and/or 134 may provide more or less functionality than is described. For example, one or more of modules 120, 122, 124, 126, 128, 130, 132, and/or 134 may be eliminated, and some or all of its functionality may be provided by other ones of modules 120, 122, 124, 126 128, 130, 132 and/or 134. As another example, processor(s) 102 may be configured to execute one or more additional modules that may perform some or all of the functionality attributed below to sine of modules 120, 122, 124, 126, 128, 130, 132, and/or 134.

Figure 2A:
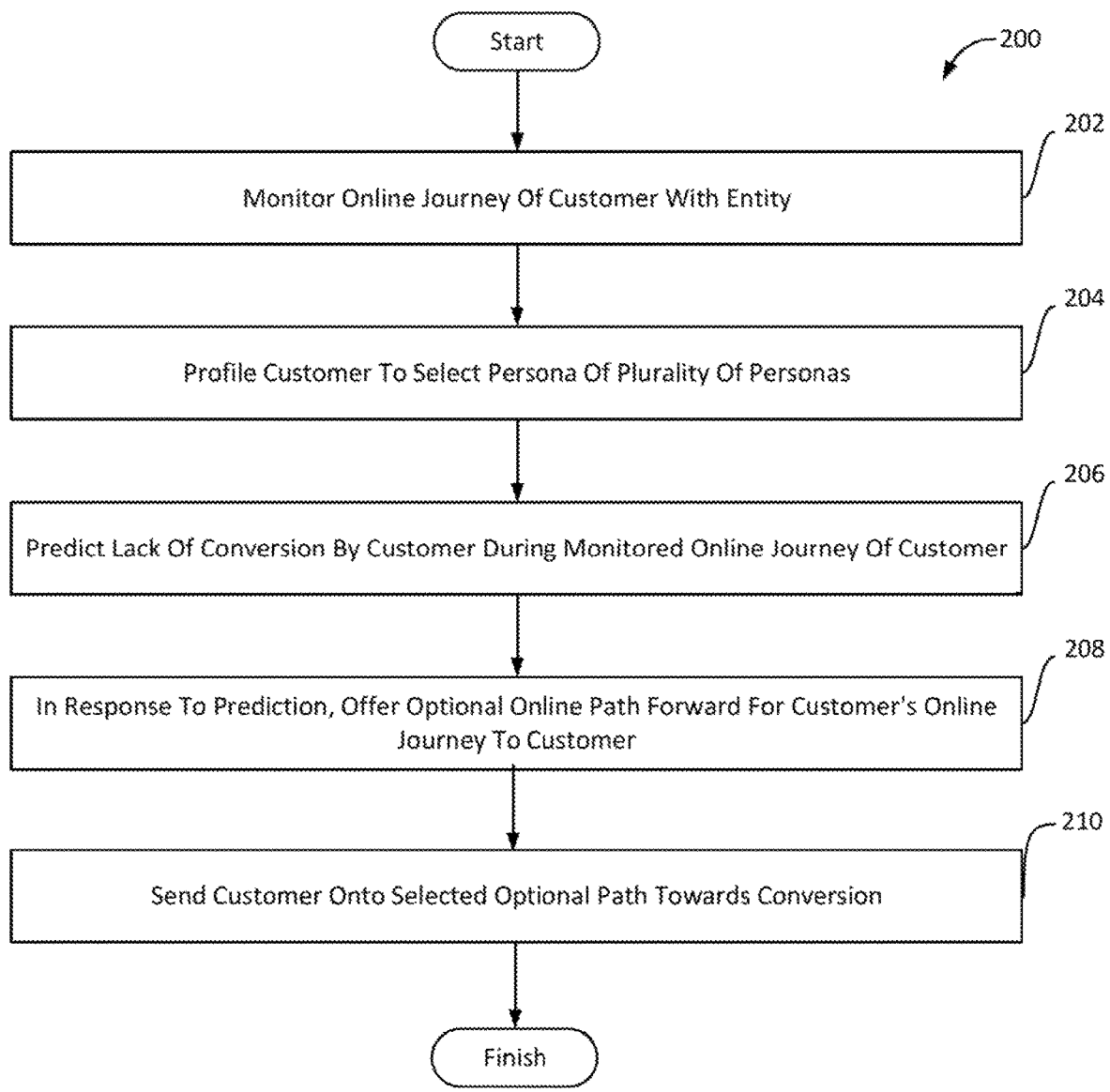
FIGS. 2A, 2B, and/or 2C illustrates a method that facilitates he conversion of customers during their online journeys, in accordance with one or more implementations.
Figure 2B:
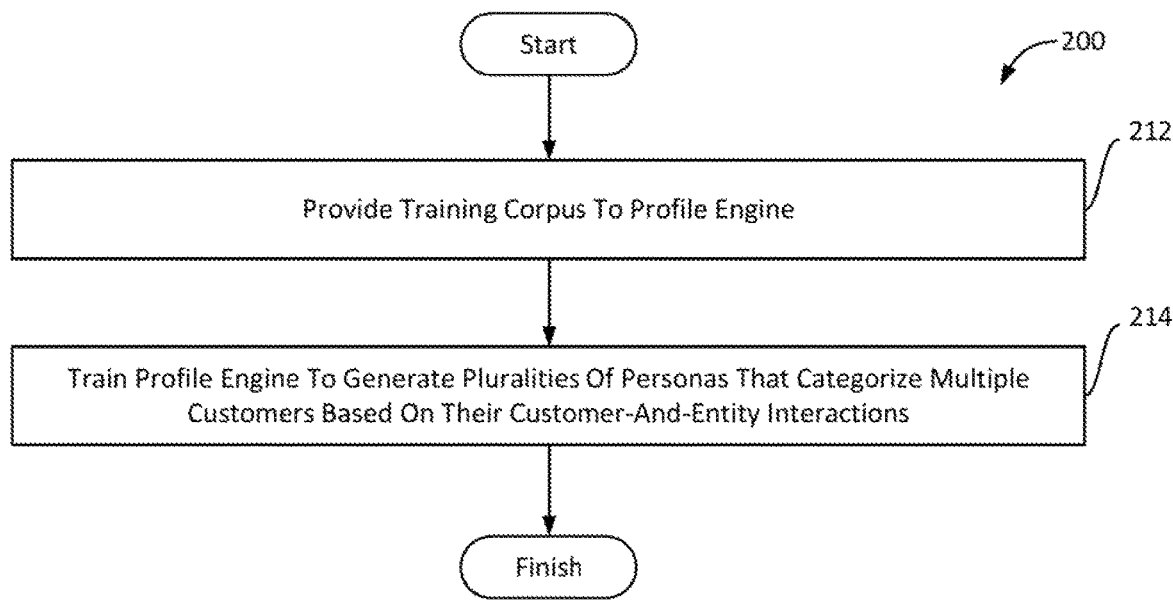

FIGS. 2A, 2B, and/or 2C illustrates method 200 that facilitates the conversion of customers during their online journeys, in accordance with one or more implementations. The operations of method 200 presented below are intended to be illustrative. In some implementations, method 200 may he accomplished with one or more additional operations not described and/or without one or more of the operations discussed. Additionally, the order in which the operations of method 200 are illustrated in FIGS. 2A, 28, and/or 2C and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

FIG. 2A Illustrates method 200, in accordance with one or more implementations.

An operation 202 may include monitoring an online journey of a customer with an entity. Operation 202 may be performed by one or more hardware processors configured by machine-readable instructions including a module that is the same as or similar to journey monitoring module 108, in accordance with one or more implementations.

An operation 204 may include profiling the customer to select a persona of a plurality of personas. Each persona may have one or more prototype customer journeys associated therewith and wherein the profiling selection is based, at least in part, on the closest match between the customer's online journey and its selected persona of the pluralities of personas. Operation 204 may be performed by one or more hardware processors configured by machine-readable instructions including a module that is the same as or similar to customer profiling module 122, in accordance with one or more implementations.

An operation 206 may include predicting a lack of conversion by the customer during the monitored online journey of the customer. The prediction may be based, at least in part. The selected persona of the customer wherein a conversion includes the customer may purchase or committing to purchase goods or services from the entity. Operation 206 may be performed by one or more hardware processors configured by machine-readable instructions including a module that is the same as or similar to non-conversion prediction module 124, in accordance with one or more implementations.

An operation 208 may include in response to the prediction, offering an optional online path forward for the customer's online journey to the customer. The optional online path may be one that is likely to lead to the conversion of the customer. The prediction may be based, at least in part, on a path to conversion for the selected persona. Operation 208 may be performed by one or more hardware processors configured by machine-readable instructions including a module that is the same as or similar to path providing module 126, in accordance with one or more implementations.

An operation 210 may include further including sending the customer onto the selected optional path towards conversion. Operation 210 may be performed by one or more hardware processors configured by machine-readable instructions including a module that is the same as or similar to sending path module 128, in accordance with one or more implementations.

FIG. 28 illustrates method 200, in accordance with one or more implementations.

An operation 212 may include providing a training corpus to a profile engine. The training corpus may include historical data related to multiple customers, historical data related to customer-and-entity interactions of the multiple customers, and historical data of online journeys of multiple customers, and historical data regarding conversions of the multiple customers. Operation 212 may be performed by one or more hardware processors configured by machine-readable instructions including a module that is the same as or similar to training corpus providing module 130, in accordance with one or more implementations.

An operation 214 may include training the profile engine to generate the pluralities of personas that categorize the multiple customers based on their customer-and-entity interactions. Operation 214 may be performed by one or more hardware processors configured by machine-readable instructions including a module that is the same as or similar to profile engine training module 132, in accordance with one or more implementations.

Figure 2C:
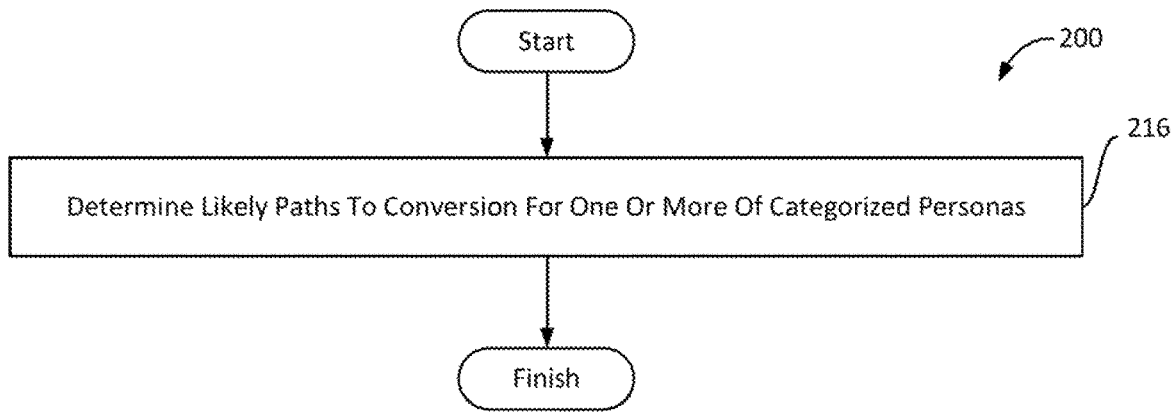

FIG. 2C illustrates method 200, in accordance with one or more implementations.

An operation 216 may include further including determining likely paths to conversion for one or more of the categorized personas. Operation 216 may be performed by one or more hardware processors configured by machine-readable instructions including a module that is the same as or similar to path determination module 134, in accordance with one or more implementations.

Additional and Alternative Implementation Notes

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In the above description of example implementations, for purposes of explanation, specific numbers, materials configurations, and other details are set forth in order to better explain the present disclosure. However, it will be apparent to one skilled in the art that the subject matter of the claims may be practiced using different details than the examples ones described herein. In other instances, well-known features are omitted or simplified to clarify the description of the example implementations.

The terms "techniques" or "technologies" may refer to one or more devices, apparatuses, systems, methods, articles of manufacture, and/or executable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone, with hardware, and/or with hardware in combination with firmware or software. In the context of software/firmware, the blocks represent instructions stored on one or more non-transitory computer-readable storage media that, when executed by one or more processors or controllers, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

As will be appreciated by one skilled in the art, the technology described herein may be embodied as a method, system, or computer program product. Accordingly, embodiments of the technology described herein may be implemented entirely in hardware or a combination of hardware and software (including firmware, resident software, microcode, etc.) These various embodiments may all generally be referred to herein as a "circuit," "module," or "system." Furthermore, the technology described herein may take the form of a computer program on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the technology described herein may be written in an object oriented programming language such as Java, Smalltalk, C++ or the like. However, the computer program code for carrying out operations of the technology described herein may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote a wide area network (WAN), or the connection may be made to an external computer (for example, through the Internet using an Internet Service Provider).

Embodiments of the technology described herein are described with reference to flowchart illustrations and/or block diagrams of methods, apparatus (systems) and computer program products according to embodiments of the technology described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the Instructions which execute on the computer or other programmable apparatus provide steps for implementing the functions/acts specified in the flowchart and/or block diagram block or blocks.

The technology described herein is well adapted to attain the advantages mentioned as well as others inherent therein. While the technology described herein has been depicted, described, and is defined by reference to particular embodiments of the technology described herein, such references do not imply a limitation on the technology described herein, and no such limitation is to be inferred. The technology described herein is capable of considerable modification, alteration, and equivalents in form and function, as will occur to those ordinarily skilled in the pertinent arts. The depicted and described embodiments are examples only, and are not exhaustive of the scope of the technology described herein.

Consequently, the technology described herein is intended to be limited only by the spirit and scope of the appended claims, giving full cognizance to equivalents in all respects.

What is claimed is:

1. A system configured that facilitates encouragement of conversion of customers during their online journeys, the system comprising:
   one or more hardware processors configured by machine-readable instructions to:
   monitor using a monitoring module of an information handling system, an online journey of a customer with an entity;
   profile the customer using a monitoring module of the information handling system, to select a persona of a plurality of personas, each persona having one or more prototype customer journeys associated therewith and defined by a human name and a mnemonic descriptor preceding the human name, and wherein the profiling selection is based at least in part, on a closest match between the customer's online journey and its selected persona of the pluralities of personas;
   provide a training corpus to a profile engine of the information handling system, wherein the training corpus includes historical data related to multiple customers, historical data related to customer-and-entity interactions of the multiple customers, and historical data of online journeys of multiple customers, and historical data regarding conversions of the multiple customers;
   train the profile engine using machine learning, to generate the pluralities of personas that categorize the multiple customers based on their customer-and-entity interactions;
   predict a lack of conversion by the customer during the monitored online journey of the customer, the prediction being based, at least in part, on the selected persona of the customer wherein a conversion includes the customer purchasing or committing to purchase goods or services from the entity, wherein the predicting of lack of conversion considers a life of an online campaign as a factor; and
   in response to the prediction, offer an optional online path forward for the customer's online journey to the customer, the optional online path being one that is likely to lead to conversion of the customer, wherein the prediction is based, at least in part, on a path to conversion for the selected persona.

2. The system of claim 1, wherein the one or more hardware processors are further configured by machine-readable instructions to send the customer onto the selected optional path towards conversion.

3. The system of claim 1, wherein the entity has an ongoing online marketing campaign with one or more online channels for customer-to-entity interaction.

4. The system of claim 1, wherein an online journey of the customer includes interactions between the customer and the entity that occur on a public communications network.

5. The system of claim 1, wherein the profiling considers present and historical data related to the customer and present and historical data related to customer-and-entity interactions.

6. The system of claim 1, wherein the one or more hardware processors are further configured by machine-readable instructions to determine likely paths to conversion for one or more of the categorized personas.

7. A method that facilitates conversion of customers during their online journeys, the method comprising:
   monitoring using a monitoring module of an information handling system, an online journey of a customer with an entity;
   profiling the customer using a monitoring module of the information handling system, to select a persona of a plurality of personas, each persona having one or more prototype customer journeys associated therewith and defined by a human name and a mnemonic descriptor preceding the human name, and wherein the profiling selection is based, at least in part, on a closest match between the customer's online journey and its selected persona of the pluralities of personas;
   providing a training corpus to a profile engine of the information handling system, wherein the training corpus includes historical data related to multiple customers, historical data related to customer-and-entity interactions of the multiple customers, and historical data of online journeys of multiple customers, and historical data regarding conversions of the multiple customers;
   training the profile engine using machine learning, to generate the pluralities of personas that categorize the multiple customers based on their customer-and-entity interactions;
   predicting a lack of conversion by the customer during the monitored online journey of the customer, the prediction being based, at least in part, on the selected persona of the customer wherein a conversion includes the customer purchasing or committing to purchase goods or services from the entity, wherein the predicting of lack of conversion considers a life of an online campaign as a factor; and
   in response to the prediction, offer an optional online path forward for the customer's online journey to the customer, the optional online path being one that is likely to lead to conversion of the customer, wherein the prediction is based, at least in part, on a path to conversion for the selected persona.

8. The method of claim 7, further comprising sending the customer onto the selected optional path towards conversion.

9. The method of claim 7, wherein the entity has an ongoing online marketing campaign with one or more online channels for customer-to-entity interaction.

10. The method of claim 7, wherein an online journey of the customer includes interactions between the customer and the entity that occur on a public communications network.

11. The method of claim 7, wherein the profiling considers present and historical data related to the customer and present and historical data related to customer-and-entity interactions.

12. The method of claim 7, further comprising determining likely paths to conversion for one or more of the categorized personas.

13. A non-transient computer-readable storage medium having instructions embodied thereon, the instructions being executable by one or more processors to perform a method that facilitates conversion of customers during their online journeys, the method comprising:
- monitoring an online journey of a customer with an entity;
- monitoring using a monitoring module of an information handling system, an online journey of a customer with an entity;
- profiling the customer using a monitoring module of the information handling system, to select a persona of a plurality of personas, each persona having one or more prototype customer journeys associated defined by a human name and a mnemonic descriptor preceding the human name, and wherein the profiling selection is based, at least in part, on a closest match between the customer's online journey and its selected persona of the pluralities of personas;
- providing a training corpus to a profile engine of the information handling system, wherein the training corpus includes historical data related to multiple customers, historical data related to customer-and-entity interactions of the multiple customers, and historical data of online journeys of multiple customers, and historical data regarding conversions of the multiple customers;
- training the profile engine using machine learning, to generate the pluralities of personas that categorize the multiple customers based on their customer-and-entity interactions;
- predicting a lack of conversion by the customer during the monitored online journey of the customer, the prediction being based, at least in part, on the selected persona of the customer wherein a conversion includes the customer purchasing or committing to purchase goods or services from the entity, wherein the predicting of lack of conversion considers a life of an online campaign as a factor; and
- in response to the prediction, offer an optional online path forward for the customer's online journey to the customer, the optional online path being one that is likely to lead to conversion of the customer, wherein the prediction is based, at least in part, on a path to conversion for the selected persona.

14. The computer-readable storage medium of claim 13, wherein the method further comprises sending the customer onto the selected optional path towards conversion.

15. The computer-readable storage medium of claim 13, wherein the entity has an ongoing online marketing campaign with one or more online channels for customer-to-entity interaction.

16. The computer-readable storage medium of claim 13, wherein an online journey of the customer includes interactions between the customer and the entity that occur on a public communications network.

17. The computer-readable storage medium of claim 13, wherein the profiling considers present and historical data related to the customer and present and historical data related to customer-and-entity interactions.

\* \* \* \* \*